(12) United States Patent
Ramamurthy et al.

(10) Patent No.: US 11,409,726 B2
(45) Date of Patent: Aug. 9, 2022

(54) METHODS AND SYSTEM FOR CONCURRENT UPDATES OF A CUSTOMER ORDER

(71) Applicant: Home Depot Product Authority, LLC, Atlanta, GA (US)

(72) Inventors: Hari Ramamurthy, Marietta, GA (US); Chandan Venkatesh, Smyrna, GA (US); Vinay D Narayanamurthy, Atlanta, GA (US); Rathi Balasubramani, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 4 days.

(21) Appl. No.: 16/933,402

(22) Filed: Jul. 20, 2020

(65) Prior Publication Data

US 2022/0019569 A1 Jan. 20, 2022

(51) Int. Cl.
*G06F 16/00* (2019.01)
*G06F 16/23* (2019.01)
(Continued)

(52) U.S. Cl.
CPC ...... *G06F 16/2308* (2019.01); *G06F 16/2272* (2019.01); *G06F 16/2358* (2019.01); *G06F 16/2365* (2019.01); *G06Q 10/087* (2013.01)

(58) Field of Classification Search
CPC ...... G06F 8/71; G06F 16/2365; G06F 9/5038; G06F 11/1471; G06F 11/3466; G06F 11/3604; G06F 16/2358; G06F 16/2379; G06F 16/38; G06F 21/10; G06F 21/105; G06F 2201/80; G06F 8/433; G06F 11/0751; G06F 11/0793; G06F 11/1448; G06F 11/3684; G06F 16/00; G06F 16/2315; G06F 16/2329; G06F 16/2393; G06F 16/24534; G06F 16/2454; G06F 16/24565; G06F 16/275; G06F 16/283; G06F 16/901; G06F 9/44552; G06F 2201/865; G06F 9/4881;
(Continued)

(56) References Cited

U.S. PATENT DOCUMENTS 8,225,271 B2 7/2012 Eldridge et al.
8,453,112 B1 5/2013 Brambley et al.
(Continued)

OTHER PUBLICATIONS

ISA/US, ISR/WO issued in Appl No. PCT/US21/41023, dated Oct. 4, 2021, 9 pgs.

*Primary Examiner* — Shyue Jiunn Hwa
(74) *Attorney, Agent, or Firm* — Greenberg Traurig, LLP

(57) ABSTRACT

An order management system in electronic communication with a database may be configured to manage concurrent update requests for the order data stored in the database. In particular, the order management system may be configured to receive two or more order modification requests, determine that the second order modification request includes one or more aspects that conflict with the modified order and includes one or more aspects that do not conflict with the modified order, send a notification to the second user, wherein the notification includes the one or more aspects that conflict with the modified order, and modify the modified order according to the one or more aspects of the second order modification request that do not conflict with the modified order to create a second modified order.

13 Claims, 5 Drawing Sheets

(51) Int. Cl.
*G06F 16/22* (2019.01)
*G06Q 10/08* (2012.01)

(58) Field of Classification Search
CPC ............. G06F 11/2097; G06F 11/3428; G06F 16/256; G06F 16/34; G06F 21/16; G06F 8/41; G06F 9/50; G06F 9/52; G06F 16/95; G06F 16/954; G06F 21/575
See application file for complete search history.

(56) References Cited

U.S. PATENT DOCUMENTS

| | | | |
|---|---|---|---|
| 8,826,222 | B2 | 9/2014 | Bak et al. |
| 8,868,506 | B1 | 10/2014 | Bhargava et al. |
| 8,909,610 | B2 | 12/2014 | Reid et al. |
| 9,342,531 | B2 | 5/2016 | Barton |
| 9,652,485 | B1 | 5/2017 | Bhargava et al. |
| 10,866,968 | B1 * | 12/2020 | Cole .................... G06F 11/1448 |
| 2002/0174040 | A1 | 11/2002 | Hurt et al. |
| 2003/0131326 | A1 | 7/2003 | Pfeil et al. |
| 2003/0137536 | A1 | 7/2003 | Hugh |
| 2007/0100834 | A1 | 5/2007 | Landry et al. |
| 2010/0070481 | A1 | 3/2010 | Mantena et al. |
| 2013/0185252 | A1 | 7/2013 | Palmucci |
| 2015/0199319 | A1 | 7/2015 | Newman et al. |
| 2016/0070774 | A1 | 3/2016 | Barabas et al. |
| 2016/0103677 | A1 * | 4/2016 | Melski .................. G06F 9/5038 717/120 |
| 2019/0340168 | A1 | 11/2019 | Raman et al. |

* cited by examiner

METHODS AND SYSTEM FOR CONCURRENT UPDATES OF A CUSTOMER ORDER

FIELD OF THE DISCLOSURE

This disclosure is generally directed to database management, including the management of concurrent updates on an order and its related entities stored in the database.

BACKGROUND OF RELATED ART

In many database applications, there are often many concurrent update requests for the same order stored in the database. For example, in multi-channel order management systems, there are often concurrent update requests from two or more customers. These customers could both be consumers as well as business entities that have multiple employees that may manage the order. Concurrent updates may also be an issue in other database contexts, such as a database storing a customer order, a database storing a purchase order, a database storing a return order, etc.

A first known approach for handling concurrent user updates to an order in a database is a pessimistic approach, in which concurrent updates are not allowed. In the pessimistic approach, a single user at a time is given access to the order entity. The pessimistic approach enforces exclusive rights on the order, so no other channel or system can update the order while it is being accessed by the user.

A second known approach is a purely optimistic approach, in which concurrent updates are accepted. In the purely optimistic approach, the database determines whether the concurrent updates contradict each other at the point of order submission. If so, the database rejects updates that take the order and related entities to an inconsistent state (e.g., the later-in-time update). In this approach, whether the changes will be completed successfully is only known at the point of submission.

SUMMARY

An example system may include a data management system configured to be in electronic communication with a database, the data management system comprising a non-transitory computer-readable program memory storing instructions, a non-transitory computer-readable data memory, and a processor configured to execute the instructions. The processor may execute the instructions to receive a first data modification request from a first user for the original data stored in the database; modify the original data based on the first data modification request; receive a second data modification request from a second user for the original data stored in the database; determine that the second data modification request includes one or more aspects that conflict with the modified data and includes one or more aspects that do not conflict with the modified data; in response to the determination that the second data modification request includes one or more aspects that conflict with the modified data and includes one or more aspects that do not conflict with the modified data, send a notification to the second user, wherein the notification includes the one or more aspects that conflict with the modified data; and modify the modified data according to the one or more aspects of the second data modification request that do not conflict with the modified data to create a second modified data.

An example method may comprise receiving, by a computing device, a first data modification request from a first user for an original data stored in a database; modifying, by the computing device, the original data based on the first data modification request; receiving, by the computing device, a second data modification request from the second user for the original data stored in the database; determining, by the computing device, that the second data modification request includes one or more aspects that conflict with the modified data and includes one or more aspects that do not conflict with the modified data; in response to determining that the second data modification request includes one or more aspects that conflict with the modified data and includes one or more aspects that do not conflict with the modified data, sending, by the computing device, a notification to the second user, wherein the notification includes the one or more aspects that conflict with the modified data; and modifying, by the computing device, the modified data according to the one or more aspects of the second data modification request that do not conflict with the modified data to create a second modified data.

An example system may include a database and an order management system in electronic communication with the database. The order management system may comprise a non-transitory computer-readable program memory storing instructions, a non-transitory computer-readable data memory, and a processor configured to execute the instructions to receive a first review request from a first user to review an original order stored in the database; in response to receiving the first review request, opening a first order revision session of the original order with the first user based on the first review request; receive a second review request from a second user to review the original order stored in the database; in response to receiving the second review request, opening a second order revision session of the original order with the second user while the first order revision session is open; receive a first order modification request from the first user for the original order stored in the database, the first order modification request generated based on revisions entered by the first user through the first order revision session of the original order; modify the original order based on the first order modification request; receive a second order modification request from the second user for the original order stored in the database, the second order modification request generated based on revisions entered by the second user through the second order revision session of the original order; determine that the second order modification request includes one or more aspects that conflict with the modified order and includes one or more aspects that do not conflict with the modified order; in response to the determination that the second order modification request includes one or more aspects that conflict with the modified order and includes one or more aspects that do not conflict with the modified order, send a notification to the second user, wherein the notification includes the one or more aspects that conflict with the modified order; and modify the modified order according to the one or more aspects of the second order modification request that do not conflict with the modified order to create a second modified order.

DETAILED DESCRIPTION

Figure 1:
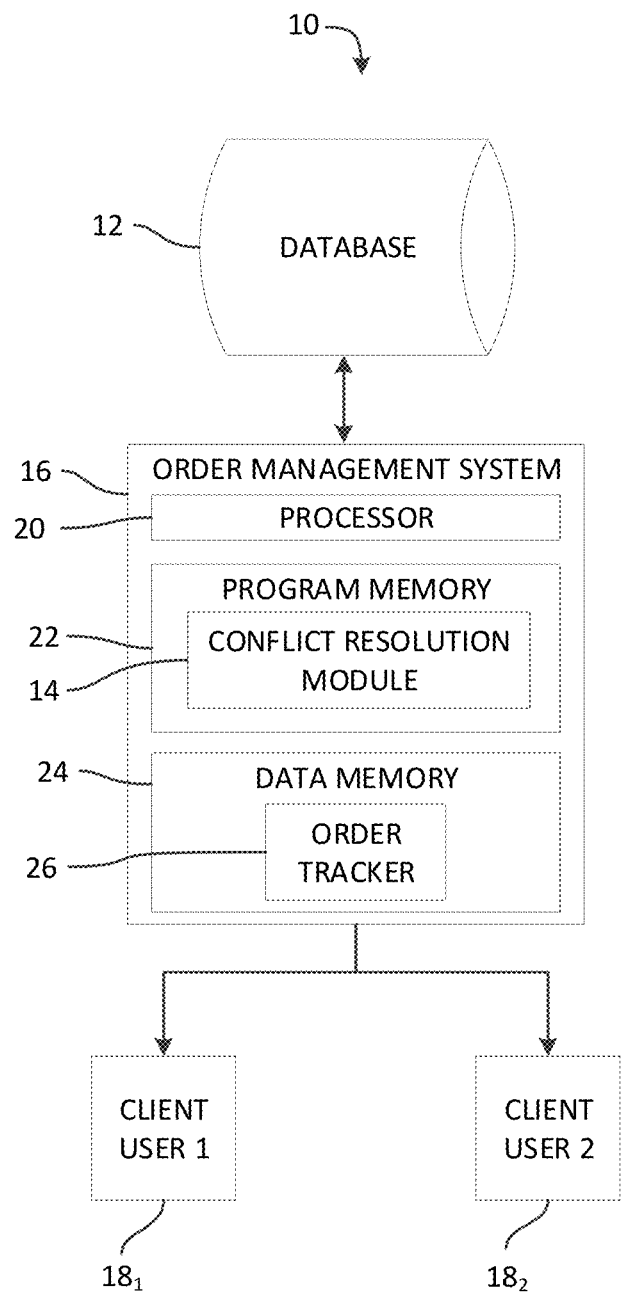
FIG. 1 is a diagrammatic view of an example system for receiving and servicing concurrent update requests on an order stored in a database.

In some embodiments, a database may be required to service a plurality of concurrent update requests on the same order. For example, a retail inventory database may be asked to service many concurrent update requests on the same order such as purchase order, return order, exchange order, etc. Thus, in an omni-channel world, maintaining the integrity of a customer order when an entity related to the order tries to make an update is critical.

When multiple parties related to an order wish to modify the order around the same time, it is important to ensure that accurate information is displayed to all interested parties and that inconsistent changes made by different parties are incorporated appropriately into the underlying data.

However, both the pessimistic and purely optimistic approaches listed above have disadvantages. For example, because a pessimistic approach permits editing by only a single user at a time, it prevents a large order from being concurrently updated by different personnel at the customer's organization or by multiple users, even though such concurrent edits may be to different portions of the order.

On the other hand, though the optimistic approach permits concurrent updates, it can result in an entire update being rejected though only a specific portion, like say only 1 order line in a 100-line order, will reach an inconsistent state from the concurrent updates. Such blanket rejections can cause a high degree of frustration to the user associated with the rejected update, as the time spent on that update will be wasted and the entire update will need to be re-entered.

The present disclosure includes a novel approach for managing concurrent update requests for the same order (e.g., a purchase order) stored in a database. The novel approach will be disclosed as being implemented in an order management system, which is among one of the many possible implementations. For example, the novel approach may be implemented in many different data management systems, such as a transportation management system (TMS), a warehouse management system (WMS), an order management system (OMS), or other data management systems. Some or all of the functionality of the order management system may be provided as separate computing resources (i.e., separate processing and memory resources) from the database, in some embodiments, and thus may enable the database to perform more efficiently and reliably, as will be described in greater detail below. In such embodiments, the order management system may be disposed between the database and the users that submit updates, such that communications between the users and the database flow through the order management system. Alternatively, in some embodiments, some or all of the database management system functionality disclosed herein may be provided as functionality of the database itself. Furthermore, an order management system according to the present disclosure may enable more efficient and reliable servicing of requests for information from the database.

The instant disclosure will address embodiments in which an order management system manages concurrent update requests for the same order (e.g., purchase order) stored in an inventory database. It should be understood, however, that such description is by way of example only. The methods, techniques, and other teachings of this disclosure may find use with databases in a wide variety of contexts. For example, the present teachings may find use with databases in the insurance and banking contexts, as well as other contexts.

FIG. 1 is a diagrammatic view of a system 10 for receiving and servicing concurrent update requests on an order stored in a database. The system 10 may include a database 12, a conflict resolution module 14, an order management system 16, and two or more client users 18$_1$, 18$_2$ (which may be referred to collectively as client users 18 or individually as client user 18 or user 18).

The database 12 may store records respective of orders. For example, the database 12 may store purchase orders, return orders, or other customer orders like an exchange order for replacement goods, pickup instructions for stores or warehouse management systems, work orders related to a delivery, installation, or measurement, customer communication records that are staged for transmission, company associates tasks that are related to the order, etc.

The client users 18 may be computing devices of end users. For example, the client users 18 may be customers, or vendors that placed the order. In some embodiments, the client users 18 may be employees of the customers or vendors who want to modify or update the order. In some embodiments, the client users 18 may be employees of a retailer or other proprietor of the database 12. The client users 18 may send concurrent update requests on the same order through various channels like a call center, in store system handling the customer request, mobile channel or an online self-service portal, in some embodiments.

In other embodiments, multiple systems may attempt to concurrently update sections of the order based on automated or manual interactions with that system. In an embodiment, the system may be a vendor system which may update the purchase order. In one embodiment, the system may be a delivery system which may update the status of a delivery. In another embodiment, the system may be a store inventory management or warehouse management system which can update the status of a fulfillment instruction to the location.

The order management system 16 may provide many functions involved in the placement, modification, and fulfillment of orders having records in the database 12. For example, the order management system 16 may track orders through the fulfillment process, may cancel and modify orders, may store, revise, and provide data necessary for shipping an order, may release ordered merchandise to the consumer, and may provide additional functions useful or necessary in the order placement and fulfillment process.

In an embodiment, the order management system 16 may be disposed between (in terms of communications) the client users 18 and the database 12—i.e., the order management system 16 may achieve transmission of update requests (including resolved concurrent update requests) to the database 12, and may receive responses from the database 12. In other embodiments, other or additional systems or subsystems may be logically disposed between the order management system 16 and the database 12. In such embodiments, the order management system 16 may achieve communications with the database 12 through such other or additional systems or sub-systems. In addition, as noted above, the teachings of the instant disclosure may find use in many database management contexts.

The order management system 16 may be in electronic communication with the database 12 and with the plurality of client users 18. The order management system 16 may act as an intermediary between the users 18 and the database 12 for servicing concurrent update requests for an order stored in the database 12 from the users 18. Accordingly, the order management system 16 may receive concurrent update requests for an order stored in the database 12 from the client users 18, process those concurrent update requests, and forward those requests to database 12 as appropriate, according to the teachings of this disclosure.

Just as communications between the order management system 16 and the database 12 may be direct or indirect, so too communications between the order management system 16 and the request origins 18 may be direct or indirect. In embodiments, communications between the request management system 16 and one or more of the client users 18 may be through one or more servers or other systems or sub-systems. As noted above, the client users 18 may send concurrent update requests through various channels like a call center, in store system handling the customer request, mobile channel or an online self-service portal, in some embodiments.

The order management system 16 may include a processor 20, program memory 22, and data memory 24. The program memory 22 may store instructions that may be executed by the processor 20 to perform one or more of the methods, techniques, steps, etc. of this disclosure. A conflict resolution module 14 may be included in the program memory. The data memory 24 may include an order tracker module 26, in an embodiment.

The order tracker module 26 may record one or more versions of one or more orders stored in the database 12, and may further store records of which versions are or were accessed by which users. For example, when Client A requests information about customer order O1 at time T1, the order tracker module 26 may record that Client A has requested information for O1 at T1, and then the request may be dispatched to the database 12 to get the requested information about O1. In some embodiments, once the database responds, the order tracker module 26 may record a unique identifier associated with the version of order O1 that was served to Client A. In an embodiment, each order version may be distinct from each other order version and may be associated with its own unique identifier.

The order tracker module 26 may include identifiers respective of one or more requests. Request identifiers may be or may include the timestamps and other attributes such as, for example, an email address of an entity that placed an order, in an embodiment.

In some embodiments, the conflict resolution module 14 may determine if and to what extent concurrent order updates conflict with each other, may merge non-conflicting concurrent update aspects and may flag conflicting concurrent updates for further action. At the time that a client 18 submits an order update, the conflict resolution module 14 may check if the order stored in the database 12 has changed since the client 18 requested the order information (e.g., to determine if the client 18 was submitting updates to an out-of-date or superseded order). If the update request includes a portion that does not conflict with the current or latest order version stored in the database 12, the conflict resolution module 14 may merge that non-conflicting portion with the latest version of the order and send the successfully merged order response to the client 18. If the update request includes a portion that does conflict with the current or latest order version stored in the database 12, the conflict resolution module 14 may transmit a notification to the client user 18 that requested the update with the conflicting portions of the update request so that the conflicting portions can be manually resolved by the client 18.

The order management system 16 may perform one or more steps, methods, or techniques described below to improve conflict resolution for concurrent update requests on an order stored in the database 12. For example, the order management system 16 may find use with the example methods of FIGS. 2-4.

Figure 2:
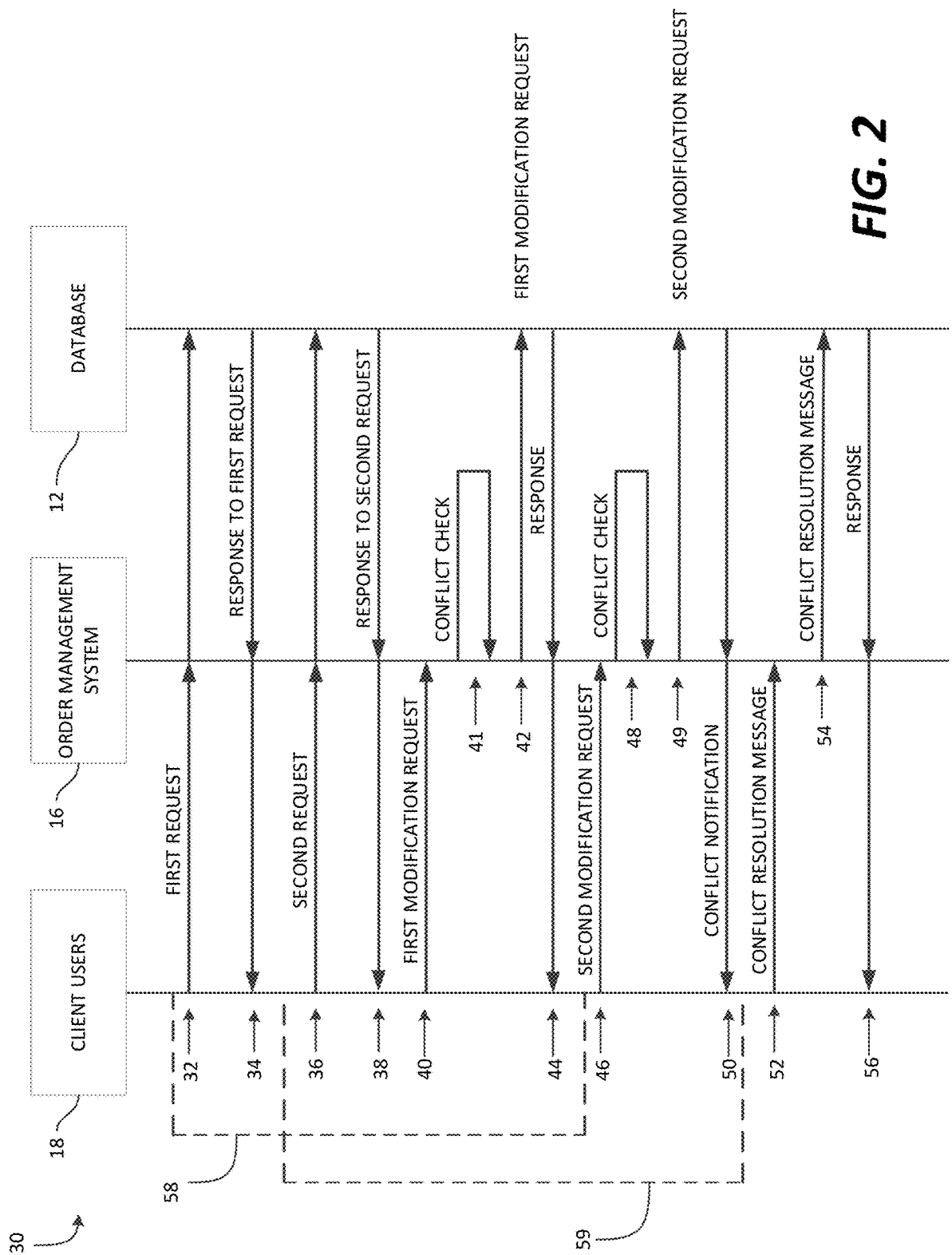
FIG. 2 is a sequence diagram illustrating an example method of concurrent updates management process for a database.

FIG. 2 is a sequence diagram illustrating an example concurrent updates management method 30 that may be performed by a database 12 in conjunction with the order management system 16.

The method 30 of FIG. 2 may include a step 32 in which the first client user $18_1$ transmits a first review request, for reviewing an order stored in the database 12, to the order management system 16, and then the order management system 16 may transmit the first review request to the database 12.

The method 30 may further include a step 34 that includes the database 12 transmitting a first response, to the first review request, to the order management system 16, and then the order management system 16 may transmit the first response to the first review request to the first client user $18_1$. The first response may include the original version of the order requested in the first review request. For example, in an embodiment in which the review request is the first request to review information about the order, the first response may include the original version of the order if the order has not changed since the first review request. It should be noted that the term "original" is used herein to contrast with "updated", and does not necessarily denote an order that has never been revised. Rather, the term "original" as used herein denotes an order version before it is revised based on a given set of concurrent update requests.

In some embodiments, the order management system 16 may cache or otherwise store the original version of the order requested in the first review request. More generally, the original version of the data entity requested in the first review request may be cached by the order management system 16 (or other data management system, in other embodiments). In some embodiments, the order management system 16 may maintain a cached version of the data entity for as long as any user is accessing the cached order version. In such an embodiment, the order management system 16 may erase from its memory a cached version once there is no user accessing that order version.

The method 30 of FIG. 2 may further include a step 36 in which the second client user $18_2$ transmits a second review request, for reviewing the order stored in the database 12, to the order management system 16, and then the order management system 16 may transmit the second review request to the database 12.

The method 30 may further include a step 38 that may include the database 12 transmitting a second response, to the second review request, to the order management system 16, and then the order management system 16 may transmit the second response to the second review request to the second client user $18_2$. The second response may include the original version of the order requested in the second review request. For example, in an embodiment in which the second review request is the request to review information about the order, the second response may include the original version of the order if the order has not changed since the second review request.

The method 30 of FIG. 2 may include a step 40 in which the first user $18_1$ may transmit a first order modification request, for modifying/updating the order requested in step 32, to the order management system 16. The first order modification request may include revisions to one or more aspects of the original version of the order. In some embodiments, the first order modification request may include respective changes to a plurality of aspects of the order.

The method 30 of FIG. 2 may further include a step 41 in which the order management system 16 (e.g., the conflict resolution module 14 of the order management system 16) may determine if the contents of the first modification request conflict with any other modification request that was submitted since the order was provided to the first client user $18_1$ at step 34. In some embodiments, in step 41, the order management system 16 may check if the version of the order stored in the database 12 has changed since the first user $18_1$ requested for the order information in the step 32. As noted above, in some embodiments, the order tracker 26 may record one or more versions of one or more orders stored in the database 12, and each order version may be distinct from each other order version and may be associated with its own unique identifier.

In the example of the method 30 illustrated in FIG. 2, in step 41, the order management system 16 determines that the version of the order stored in the database 12 is the same as the version that was provided to the first client user $18_1$ in step 34 (i.e., the that order version has not changed). In response to the determination that the order stored in the database 12 has not changed since the first user $18_1$ was provided with the order, the order management system 16 may transmit the first order modification request to the database 12.

The method 30 of FIG. 2 may further include a step 42 in which the database 12, upon receiving the first order modification request, may modify the order stored in the database 12 based on the first order modification request, in an embodiment, resulting in a first updated order. In such an embodiment, either the database 12 or the order management system 16 may create a new order version number associated with the first updated order.

In some embodiments, the database 12 may store only the updated version, such that the original version may be overwritten in the database 12. Additionally or alternatively, the database 12 and/or order management system 16 may maintain a stored revision history or audit trail (e.g., in the order tracker 26) of the order.

The method 30 may further include a step 44 in which the database 12 may transmit a first success response, with respect to the first order modification request, to the order management system 16, and then the order management system 16 may transmit the first success response to the first user $18_1$. The first success response may indicate that the revisions included in the first modification request were entered successfully and/or the modified order was generated based on the modification of the original order version, in an embodiment.

The method 30 of FIG. 2 may further include a step 46 in which the second user $18_2$ may transmit a second order modification request, for modifying/updating the order requested in step 36, to the order management system 16.

The method 30 of FIG. 2 may further include a step 48 in which the order management system 16 (e.g., the conflict resolution module 14 of the order management system 16) may determine if the contents of the second modification request conflict with any other modification request that was submitted since the order was provided to the second client user $18_2$ at step 38. In some embodiments, in step 48, the order management system 16 may determine if the version of the order stored in the database 12 has changed since the second user $18_2$ was provided with the order in step 38. In the embodiment illustrated in FIG. 2, step 48 includes the order management system 16 determining that the order version stored in the database 12 is different from the order version provided to the second client user $18_2$ at step 38.

As noted above, the embodiment illustrated in FIG. 2 includes the order version changing between the time when the second client user $18_2$ receives the order (step 38) and the time when the second client user $18_2$ submits the second modification request (step 46). In another embodiment in which the version of the order stored in the database 12 has not changed since the second user 182 requested the order (i.e., if the first client user $18_1$ had not submitted the first modification request, or if the first modification request had been rejected), then the order management system 16 and database 12 may process the second modification request in the manner addressed with respect to the first modification request in steps 42 and 44.

In some embodiments, in step 48, the order management system 16 may compare the second modification request to the current version of the order stored in the database 12 (e.g., the first modified order created at or in response to step 42). In the comparing step 49, the order management system 16 may determine which, if any, aspects of the second modification request conflict with the current state of the order. In the embodiment illustrated in FIG. 2, the order management system 16 determines at step 49 that the second order modification request includes one or more aspects that do conflict with the first modified order (e.g., the present version of the order) and includes one or more aspects that do not conflict with the first modified order.

The method 30 of FIG. 2 may further include a step 49 in which the order management system 16 causes the order stored in the database 12 to be modified according to the one or more aspects of the second order modification request that do not conflict with the current version of the order to create a second modified order. In some embodiments, the database 12 may continue to store the first modified order, as well, and/or the order management system may cache the first modified order.

Furthermore, in some embodiments, the method 30 of FIG. 2 may further include a step 50 in which the order management system 16 may transmit a conflict notification message to the second user $18_2$. The conflict notification may include the one or more aspects of the second modification request that conflict with the with the current state of the order, in some embodiments. Additionally or alternatively, the conflict notification may include the data in the current version of the order that corresponds to the one or more conflicting aspects of the second modification request, and/or the changes to that data that were instructed in the first order modification request.

As noted above, since the first user $18_1$ accesses the order management system 16 to modify the order from step 32 to 44 (as indicated by dashed bracket 58), and the second user $18_2$ accesses the order management system 16 to modify the order from step 36 to 50 (indicated by dashed bracket 59), the first user $18_1$ and the second user $18_2$ access the original version of the order concurrently and attempt to make independent changes to that original order version.

Upon receiving the conflict notification, the second client user 18₂ may manually compare the conflicting portions of the second modification request with the current state of the relevant portions of the order, determine the appropriate resolution, and transmit a conflict resolution message in response. Accordingly, the method 30 of FIG. 2 may include a step 52 in which the second user 18₂ may transmit a conflict resolution message to the order management system 16, and the order management system 16 may receive that conflict resolution message.

In some embodiments, the method 30 of FIG. 2 may further include a step 54 in which the order management system 16 may transmit the conflict resolution message to the database 12, and the database 12 may receive that conflict resolution message. In other embodiments, the conflict resolution module 14 may further perform conflict checking aspects of steps 41, 48 on the conflict resolution message from the second user.

Upon receiving the conflict resolution message, the database 12 may modify the order stored in the database 12 based on the conflict resolution message, in an embodiment, resulting in a second updated order. In such an embodiment, either the database 12 or the order management system 16 may create a new order version number associated with the second updated order.

In some embodiments, the database 12 may only store the second updated version, such that the first updated version may be overwritten in the database 12. Additionally or alternatively, the database 12 and/or order management system 16 may maintain a stored revision history or audit trail (e.g., in the order tracker 26) such that the original version and/or the first updated version of the order can be retrieved or recreated.

The method 30 may include a step 56 in which the database 12 may transmit a second success response, with respect to the conflict resolution message, to the order management system 16, and then the order management system 16 may transmit the second success response to the second client user 18₂. The second success response may indicate that the versions included in the conflict resolution message were entered successfully and/or the current version of the order was generated based on the conflict resolution message, in an embodiment.

The inventive method of FIG. 2 improves upon known approaches for concurrent update management in several respects. First, the present disclosure allows multiple concurrent updates on the customer order as well as other related entities without frustrating waits (which may occur in traditional pessimistic solutions) or the risk of losing the data the user entered because of the rejection of the user's modification request (e.g., traditional optimistic solution). Second, the instant disclosure enables precise messages to be provided to the customer or employee on what should be corrected in order for the later-in-time update to be entered.

Figure 3:
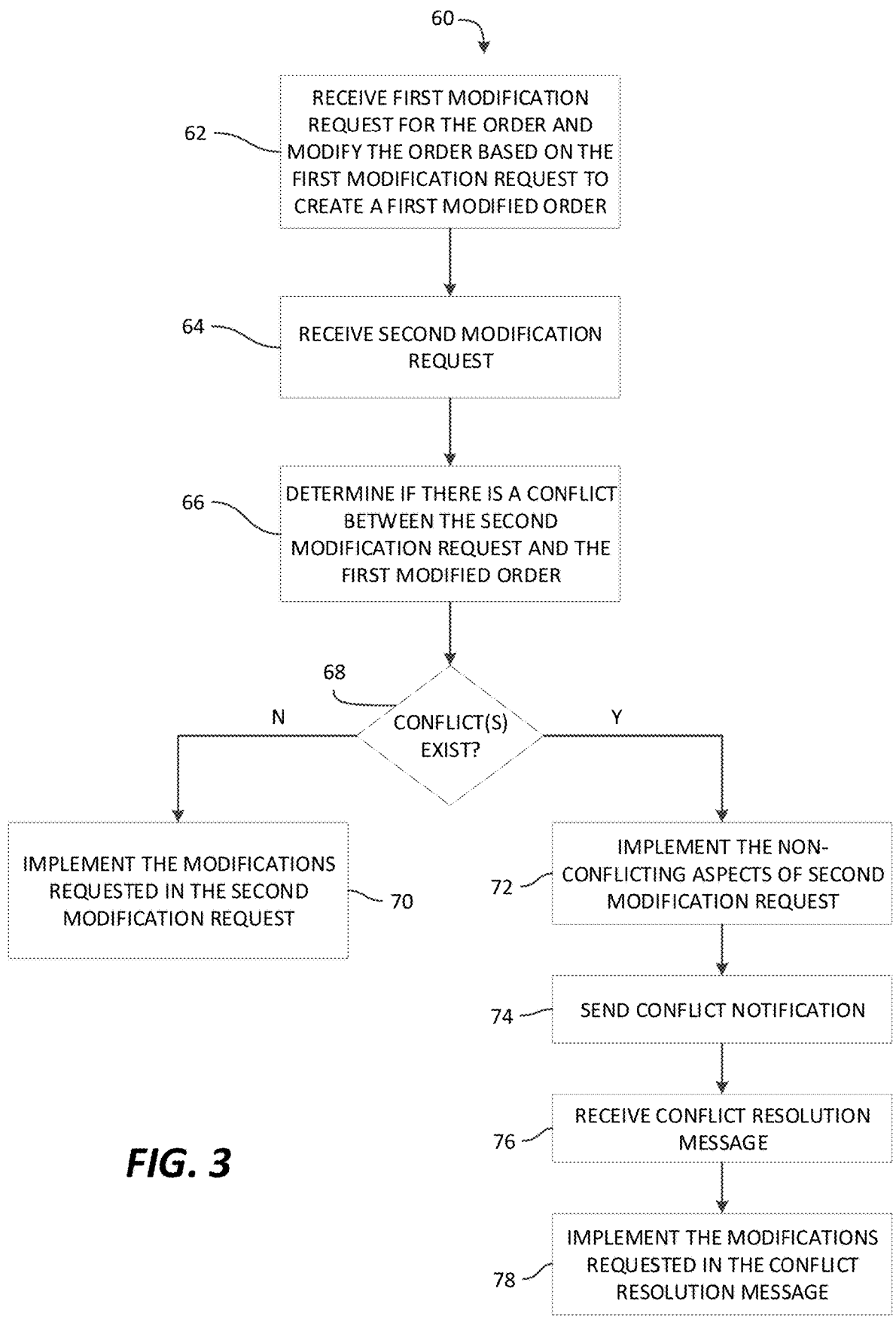
FIG. 3 is a flow chart illustrating an example method of managing concurrent updates for an order stored in a database.

FIG. 3 is a flow chart illustrating an example method 60 of managing concurrent update requests for the same order stored in the database 12. One or more steps of the method 60 may be performed by the order management system 16, in an embodiment. The method 60 will be described with reference also to the system 10 of FIG. 1.

The method 60 may include a step 62 that may include receiving a first order modification request from the first user 18₁ and causing the order to be modified based on the first modification request. Step 62 may include the operations described at steps 40, 41, 42, and 44 of the method 30 of FIG. 2, for example.

The method 60 may further include a step 64 that may include receiving a second order modification request from the second user 18₂ for modifying/updating the order stored in the database 12 (e.g., for modifying the same order as the first order modification request).

The method 60 may further include a step 66 determining if the contents of the second modification request conflict with any other modification request (e.g., the second modification request) that was submitted since the order was provided to the second client user 18₂.

The method 60 may further include a step 68 that may include determining, in response to the determination that the order version has changed from the version with respect to which the second user 18₂ submitted the second order modification request, whether the second order modification request includes one or more aspects that conflict with the modified order data, in an embodiment.

If it is determined at step 68 that the second order modification request does not include any conflicts with the current version of the order (i.e., with the first modified order), then the method 60 may further include a step 70 in which the order management system 16 may implement the modification(s) requested in the second modification request by causing the first modified order to be modified based on the second order modification request.

If the second order modification request is determined to include one or more aspects that conflict with the current order version and one or more aspects that do not conflict with the current order version at step 68, then the method 60 may further include a step 72 in which the order management system 16 may implement the non-conflicting aspects of the modifications requested in the second modification request by causing the latest version of the order to be updated based on the second order modification request, in an embodiment.

Further, if the second order modification request was determined to include one or more aspects that conflict with the current order version, then the method 60 may further include a step 74 in which the order management system 16 may send a conflict notification to the second user 18₂. Step 74 may include one or more aspects described above with respect to step 50 of the method 30 of FIG. 2, in some embodiments.

The method 60 may further include a step 76 in which the order management system 16 may receive a conflict resolution message from the second client user 18₂, which conflict resolution message may include a resolution to each conflicting aspect identified in the conflict notification. Such a resolution may include a removal, revision, or confirmation of each conflicting aspect.

The method 60 may further include a step 78 in which the order management system 16 may implement the modifications requested in the conflict resolution message by causing the latest version of the order to be updated based on the conflict resolution message, in an embodiment.

The method 60 includes separate steps 72, 78 for implementing the non-conflicting and resolved conflicting portions of the second order modification request. Alternatively, in some embodiments, the non-conflicting and resolved conflicting aspects of the second order modification request may be implemented at the same time after the conflict resolution message is received.

Figure 4:
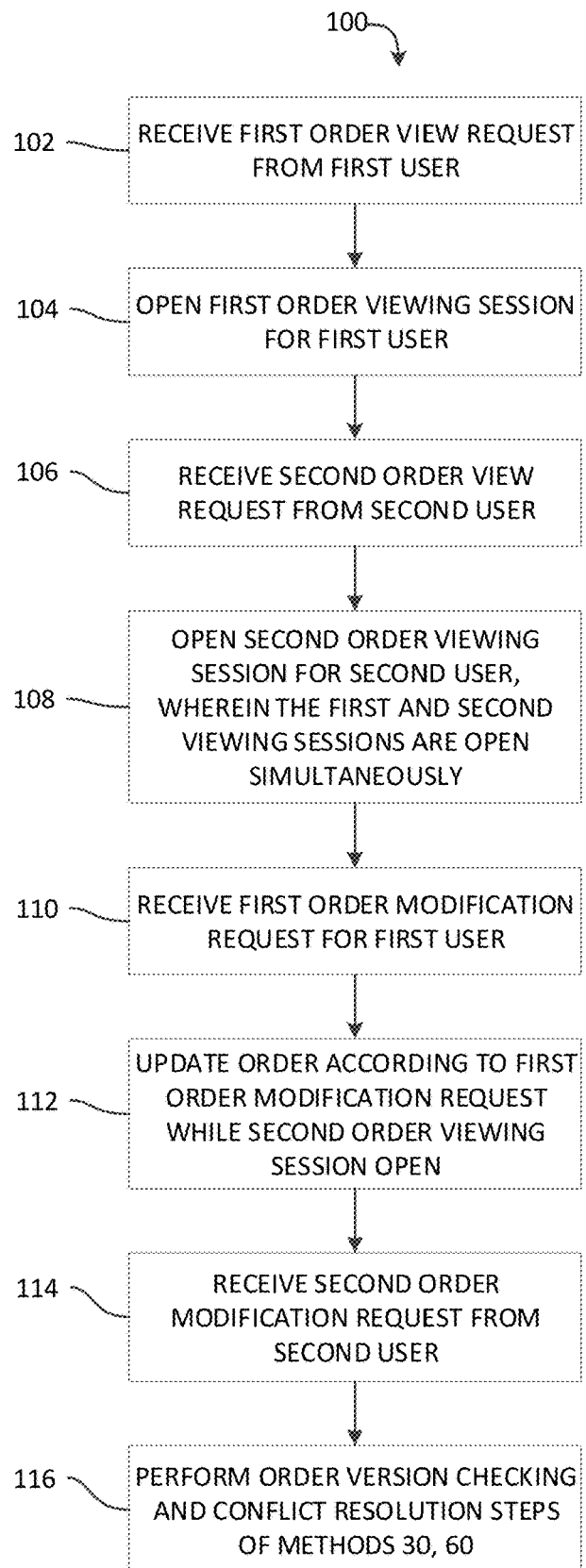
FIG. 4 is a flow chart illustrating an example method of managing concurrent updates for information stored in a database

FIG. 4 is a flow chart that illustrates an example method 100 of managing concurrent updates for the same order stored in a database. Some or all of the steps of the method 100 may be performed by an order management system 16, in an embodiment. Like FIG. 3, FIG. 4 will be described also with reference to FIG. 1.

The method 100 may include a step 102 that may include receiving a first review request from a first user $18_1$ to review an order stored in the database 12, in an embodiment. As noted above with respect to FIG. 1, in embodiments, the order management system 16 may be in electronic communication with the database 12 and with the plurality of client users 18. The order management system 16 may act as an intermediary between the users 18 and the database 12 for servicing concurrent update requests for the order stored in the database 12 from the users 18, for example.

The method 100 may further include a step 104 that includes, in response to receiving the first order review request, opening a first order viewing/revision session of the order with the first user $18_1$ based on the first review request.

The method 100 may further include a step 106 that may include receiving a second review request from a second user $18_2$ to review the order stored in the database 12, in an embodiment. As noted above, the order management system 16 may act as an intermediary between the second user $18_2$ and the database 12, in embodiments.

The method 100 may further include a step 108 that may include, in response to receiving the second review request, opening a second order viewing/revision session of the order with the second user $18_2$ while the first order viewing/revision session is still open. In some embodiments, the first user and the second user may view and revise the order simultaneously while the first and second viewing/revision sessions are both open.

The method 100 may further include a step 110 that may include receiving a first order modification request from the first user $18_1$ for the order stored in the database 12, the first order modification request generated based on revisions entered by the first user $18_1$ through the first order viewing/revision session of the order. As noted above, the first order viewing/revision session of the order is opened by the order management system 16 initiated by the first user $18_1$, in an embodiment.

The method 100 may further include a step 112 that includes modifying the order based on the first order modification request. As noted above with respect to FIG. 1, in embodiments, the conflict resolution module 14 may determine if the version of the order stored in the database 12 has changed since the first user $18_1$ requested the order. In the embodiment illustrated in FIG. 4, the order management system 16 determines at step 112 that the version of the order stored in the database 12 has not changed since the first user $18_1$ requested the order, and in response, may transmit the first order modification request to the database 12. In response, the database 12 may modify the order stored in the database 12 based on the first order modification request while the second order viewing/revising session is still open, in an embodiment. For example, the database 12 may update the order substantially as described with respect to steps 42, 44 of FIG. 2.

The method 100 may further include a step 114 that includes receiving a second order modification request from the second user $18_2$ for the order stored in the database, the second order modification request generated based on revisions entered by the second user $18_2$ through the second order viewing/revision session of the order. As noted above with respect to FIG. 1, in embodiments, the conflict resolution module 14 of the order management system 16 may determine if the version of the order stored in the database 12 has changed since the second user $18_2$ requested the order.

The method 100 may further include a step 116 that includes performing the order version checking and the conflict resolution steps of methods 30 and 60.

Figure 5:
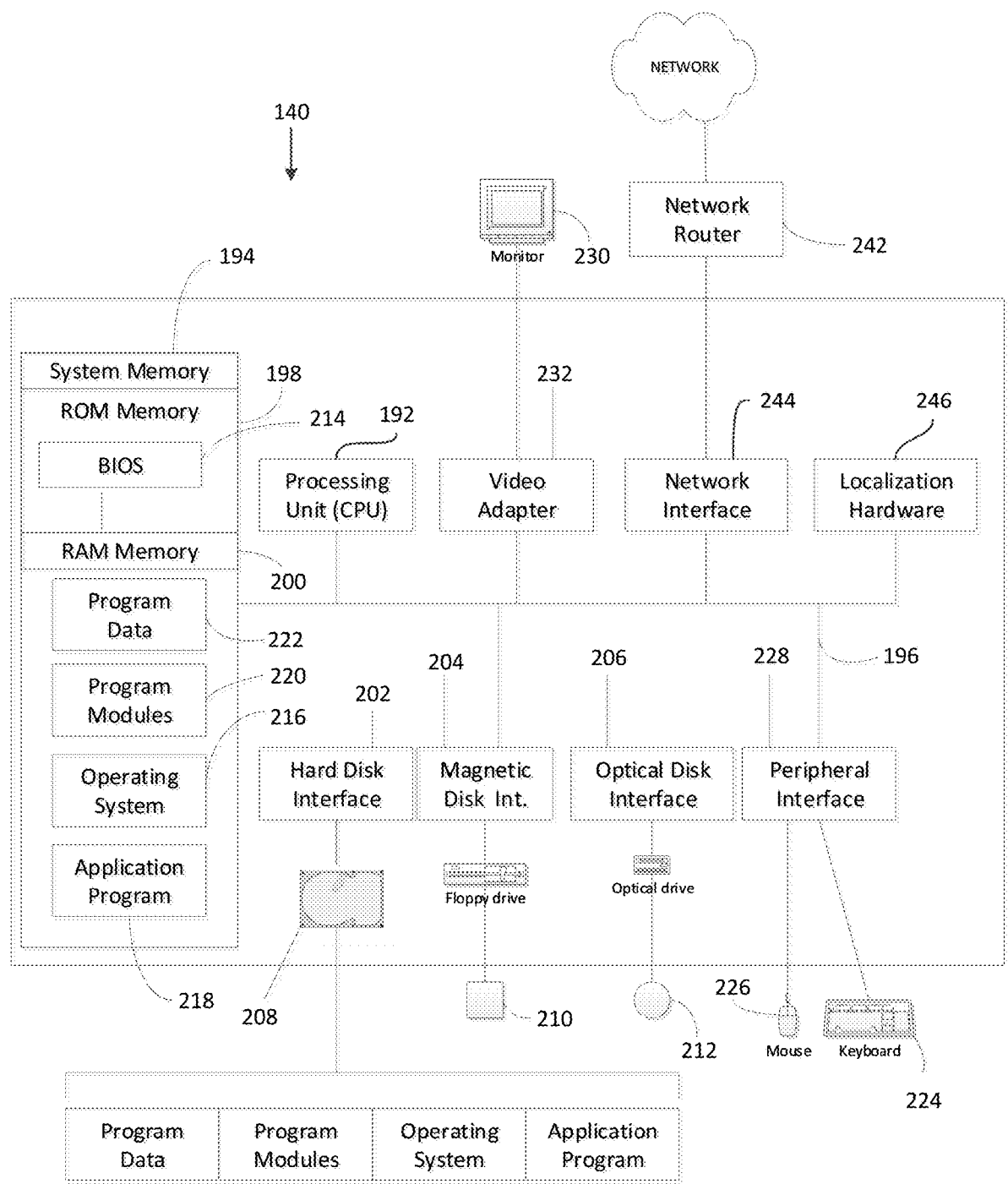
FIG. 5 is a diagrammatic view of an illustrative computing system that includes a general purpose computing system environment.

FIG. 5 is a diagrammatic view of an illustrative computing system that includes a general purpose computing system environment 190, such as a desktop computer, laptop, smartphone, tablet, or any other such device having the ability to execute instructions, such as those stored within a non-transient, computer-readable medium. Furthermore, while described and illustrated in the context of a single computing system 190, those skilled in the art will also appreciate that the various tasks described hereinafter may be practiced in a distributed environment having multiple computing systems 190 linked via a local or wide-area network in which the executable instructions may be associated with and/or executed by one or more of multiple computing systems 190.

In its most basic configuration, computing system environment 190 typically includes at least one processing unit 192 and at least one memory 194, which may be linked via a bus 196. Depending on the exact configuration and type of computing system environment, memory 194 may be volatile (such as RAM 200), non-volatile (such as ROM 198, flash memory, etc.) or some combination of the two. Computing system environment 190 may have additional features and/or functionality. For example, computing system environment 190 may also include additional storage (removable and/or non-removable) including, but not limited to, magnetic or optical disks, tape drives and/or flash drives. Such additional memory devices may be made accessible to the computing system environment 190 by means of, for example, a hard disk drive interface 202, a magnetic disk drive interface 204, and/or an optical disk drive interface 206. As will be understood, these devices, which would be linked to the system bus 196, respectively, allow for reading from and writing to a hard disk 208, reading from or writing to a removable magnetic disk 210, and/or for reading from or writing to a removable optical disk 212, such as a CD/DVD ROM or other optical media. The drive interfaces and their associated computer-readable media allow for the nonvolatile storage of computer readable instructions, data structures, program modules and other data for the computing system environment 190. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 190.

A number of program modules may be stored in one or more of the memory/media devices. For example, a basic input/output system (BIOS) 214, containing the basic routines that help to transfer information between elements within the computing system environment 190, such as during start-up, may be stored in ROM 198. Similarly, RAM 200, hard drive 208, and/or peripheral memory devices may be used to store computer executable instructions comprising an operating system 216, one or more applications programs 218 (such as the request management processes disclosed herein), other program modules 220, and/or program data 222. Still further, computer-executable instructions may be downloaded to the computing environment 190 as needed, for example, via a network connection.

An end-user, e.g., a customer, retail associate, and the like, may enter commands and information into the computing system environment 190 through input devices such as a keyboard 224 and/or a pointing device 226. While not illustrated, other input devices may include a microphone, a joystick, a game pad, a scanner, etc. These and other input devices would typically be connected to the processing unit 192 by means of a peripheral interface 228 which, in turn, would be coupled to bus 196. Input devices may be directly or indirectly connected to processor 192 via interfaces such as, for example, a parallel port, game port, firewire, or a universal serial bus (USB). To view information from the computing system environment 190, a monitor 230 or other type of display device may also be connected to bus 196 via an interface, such as via video adapter 232. In addition to the monitor 230, the computing system environment 190 may also include other peripheral output devices, not shown, such as speakers and printers.

The computing system environment 190 may also utilize logical connections to one or more computing system environments. Communications between the computing system environment 190 and the remote computing system environment may be exchanged via a further processing device, such a network router 242, that is responsible for network routing. Communications with the network router 242 may be performed via a network interface component 244. Thus, within such a networked environment, e.g., the Internet, World Wide Web, LAN, or other like type of wired or wireless network, it will be appreciated that program modules depicted relative to the computing system environment 190, or portions thereof, may be stored in the memory storage device(s) of the computing system environment 190.

The computing system environment 190 may also include localization hardware 186 for determining a location of the computing system environment 190. In embodiments, the localization hardware 246 may include, for example only, a GPS antenna, an RFID chip or reader, a WiFi antenna, or other computing hardware that may be used to capture or transmit signals that may be used to determine the location of the computing system environment 190.

The computing environment 190, or portions thereof, may comprise two or more of the components of the system 10 FIG. 1, such as embodiments of the order management system 16, the conflict resolution module 14, and/or the database 12 of FIG. 1.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system, comprising:
a data management system configured to be in electronic communication with a plurality of users and with a database, the data management system comprising:
a non-transitory computer-readable program memory storing instructions; and
a processor configured to execute the instructions to:
receive a first data modification request from a first user for original data stored in the database;
modify the original data based on the first data modification request to create modified data in the database;
receive a second data modification request from a second user for the original data stored in the database;
determine that the second data modification request includes one or more aspects that conflict with the modified data and includes one or more aspects that do not conflict with the modified data;
in response to the determination that the second data modification request includes one or more aspects that conflict with the modified data and includes one or more aspects that do not conflict with the modified data, send a notification to the second user, wherein the notification includes the one or more aspects that conflict with the modified data;

modify the modified data according to the one or more aspects of the second data modification request that do not conflict with the modified data to create second modified data;
receive a revised second data modification request from the second user for the second modified data, wherein the revised second data modification request does not include the one or more aspects that conflict with the modified data; and
update the second modified data based on the revised second data modification request.

2. The system of claim 1, further comprising the database.

3. The system of claim 1, wherein the database is an inventory database.

4. The system of claim 1, wherein the processor is configured to execute the instructions further to:
receive the original data; and
store the original data in the database.

5. The system of claim 1, wherein the processor is configured to execute the instructions further to:
in response to receiving the first data modification request, determine that the original data has not changed; and
in response to the determination that the original data has not changed, modify the original data based on the first data modification request.

6. A method, comprising:
receiving, by a computing device, a first data modification request from a first user for original data stored in a database;
modifying, by the computing device, the original data based on the first data modification request to create modified data in the database;
receiving, by the computing device, a second data modification request from the second user for the original data stored in the database;
determining, by the computing device, that the second data modification request includes one or more aspects that conflict with the modified data and includes one or more aspects that do not conflict with the modified data;
in response to determining that the second data modification request includes one or more aspects that conflict with the modified data and includes one or more aspects that do not conflict with the modified data, sending, by the computing device, a notification to the second user, wherein the notification includes the one or more aspects that conflict with the modified data;
modifying, by the computing device, the modified data according to the one or more aspects of the second data modification request that do not conflict with the modified data to create second modified data;
receiving a revised second data modification request from the second user for the second modified data, wherein the revised second data modification request does not include the one or more aspects that conflict with the modified data; and
updating the second modified data based on the revised second data modification request.

7. The method of claim 6, wherein the database is an inventory database.

8. The method of claim 6, further comprising:
receiving the original data; and
storing the original data in the database.

9. The method of claim 6, further comprising:
in response to receiving the first data modification request, determining that the original data has not changed; and
in response to the determination that the original data has not changed, modifying the original data based on the first data modification request.

10. A system, comprising:
a database;
an order management system configured to be in electronic communication with the plurality of users and with a database, the order management system comprising:
a non-transitory computer-readable program memory storing instructions; and
a processor configured to execute the instructions to:
receive a first review request from a first user to review an original order stored in the database;
in response to receiving the first review request, opening a first order revision session of the original order with the first user based on the first review request;
receive a second review request from a second user to review the original order stored in the database;
in response to receiving the second review request, opening a second order revision session of the original order with the second user while the first order revision session is open;
receive a first order modification request from the first user for the original order stored in the database, the first order modification request generated based on revisions entered by the first user through the first order revision session of the original order;
modify the original order based on the first order modification request;
receive a second order modification request from the second user for the original order stored in the database, the second order modification request generated based on revisions entered by the second user through the second order revision session of the original order;
determine that the second order modification request includes one or more aspects that conflict with the modified order and includes one or more aspects that do not conflict with the modified order;
in response to the determination that the second order modification request includes one or more aspects that conflict with the modified order and includes one or more aspects that do not conflict with the modified order, send a notification to the second user, wherein the notification includes the one or more aspects that conflict with the modified order;
modify the modified order according to the one or more aspects of the second order modification request that do not conflict with the modified order to create a second modified order;
receive a revised second order modification request from the second user for the second modified order, wherein the second user removed the one or more aspects that conflict with the modified order to generate the revised second order modification request; and
update the second modified order based on the revised second order modification request.

11. The system of claim 10, wherein the database is an inventory database.

12. The system of claim 10, wherein the processor is configured to execute the instructions further to:
- receive the original order; and
- store the original order in the database.

13. The system of claim 10, wherein the processor is configured to execute the instructions further to:
- in response to receiving the first order modification request, determine the original order has not changed; and
- in response to the determination that the original order has not changed, modify the original order based on the first order modification request.

* * * * *